Figures 1, 2:
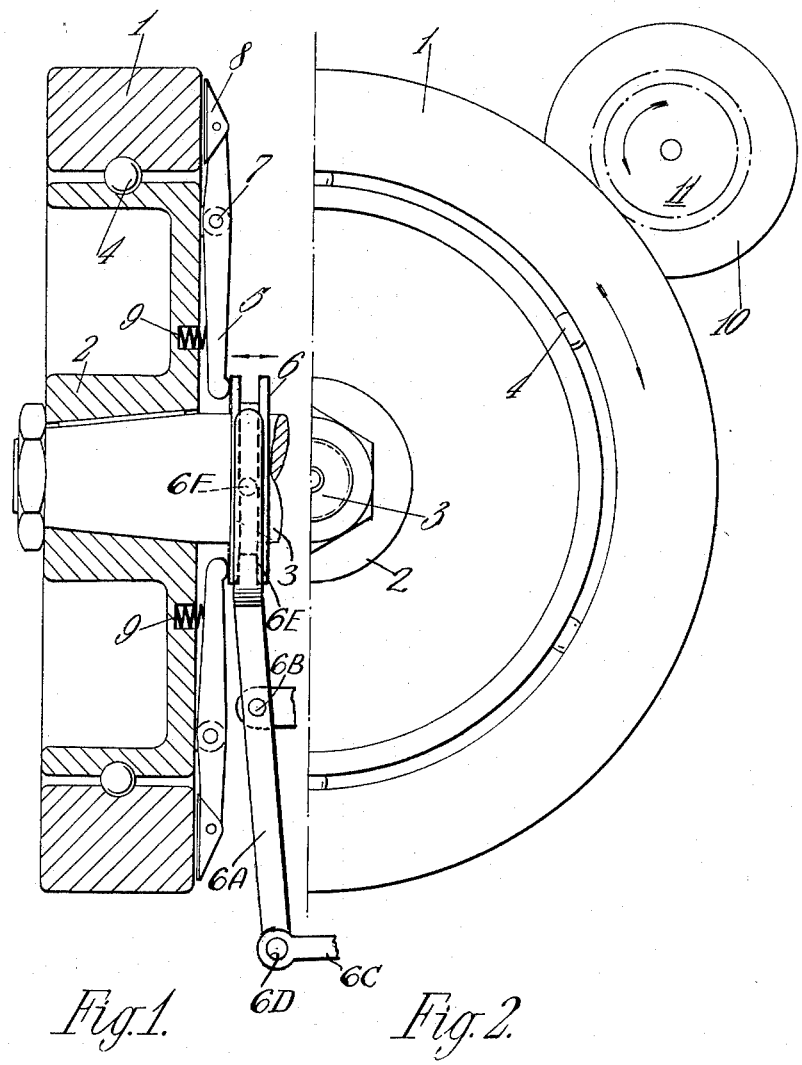

Jan. 17, 1956 V. SILBERSTEIN 2,730,911
FLYWHEELS
Filed March 24, 1952

Inventor
V. Silberstein
By Glascott Downing Seebold
Attys

United States Patent Office 2,730,911
Patented Jan. 17, 1956

2,730,911

FLYWHEELS

Victor Silberstein, Kensington, London, England

Application March 24, 1952, Serial No. 278,177

Claims priority, application Great Britain March 28, 1951

2 Claims. (Cl. 74—572)

This invention relates to internal combustion engines such as diesel and petrol engines, of the kind having a crankshaft associated with a flywheel.

Such engines have to be cranked to start them, and this is generally effected by an auxiliary electric motor, termed a starter, adapted to be clutched to the crankshaft by way of a reduction gear. To be able to turn the crankshaft at a sufficient rate when the engine is cold, the starter normally has to be of considerable power, and, in the case of a motor car, its frequent use results in rapid discharge of the car accumulators. Further, when the latter are partly run down, they frequently fail to operate the starter, and resort has to be had to manual cranking.

Heretofore, it has been proposed in British specification No. 123,342 of February 6, 1919, to form the flywheel of an engine of the type referred to as two coaxial component flywheels, one part fixed to the crankshaft and the other part relatively rotatable, in association with disengageable clutch means for constraining such parts to rotate as a unit, the second mentioned part being associated with means, such as a starter, whereby such part can be rotated when it is desired to start the engine.

According to this invention, the flywheel comprises a first component flywheel fixed to the crankshaft and a second component flywheel in the form of a heavy rim rotatably journalled on the outer annular surface of the first component flywheel, together with disengageable clutch means, preferably carried by the first component flywheel, for constraining such component elements to rotate as a unit.

In operation, assuming the engine to be stationary and said clutch means disengaged, the starter or other means provided for spinning that component flywheel rotatably mounted with respect to the crankshaft is actuated until this flywheel has reached a considerable velocity. The starter or other means is then disengaged and the clutch means engaged, whereby the rotational momentum which has been built up is distributed between the two component flywheels with consequent rotation of the crankshaft.

It will be seen that the arrangements described in the three preceding paragraphs constitute forms of inertia starters, and have the advantage that no flywheel is required in addition to the engine flywheel with consequent saving of weight.

The accompanying diagrams illustrate one embodiment of this invention, Figure 1 being a sectional view and Figure 2 a view in end elevation.

In this embodiment, an engine flywheel comprises two component flywheels, namely a heavy rim 1 rotatably mounted on a flywheel 2 fixed to crankshaft 3 of the engine (the main body of which is not shown), ball bearings 4 being interposed between members 1 and 2.

Conventional clutch means are provided for clutching rim 1 to flywheel 2, comprising levers 5, hinged to the latter by hinges 7 and provided at their outer ends with shoes 8 for engaging rim 1. Springs 9 urge shoes 8 into contact with rim 1, whilst a ring 6 slidably mounted on crankshaft 3 can be caused to engage the inner ends of levers 5 to effect declutching. The means for causing movement of the ring 6 to engage the inner ends of the levers 5 includes lever arm 6A pivoted at 6B and the lower end of the lever arm is connected to an operating link 6C as shown at 6D. The upper end of the lever arm terminates in a substantially U-shaped fork 6E provided with opposed pins 6F which project into the annular groove of the ring 6. Hence, movement of the link 6C to the right will move the fork 6E and as a consequence, the ring 6 to the left to engage the inner ends of the levers.

When the engine is stationary and the clutch comprising levers 5 is disengaged, rim 1 can readily be brought to high speed by a conventional starter 10 (Figure 2) acting through wheel or pinion 11. After reaching a suitable speed, starter 10 is disengaged from rim 1 and the latter is clutched to flywheel 2 by movement of ring 6; rim 1 and flywheel 2 then revolve as a unit, constituting the engine flywheel, to start the engine.

If desired, the means provided for disengaging starter 10 from rim 1 and for moving ring 6 to clutch rim 1 to flywheel 2 may be coupled so that these two actions are synchronised.

It is a particular advantage of engines constructed in accordance with this invention that they can be started by starters of relatively low power.

I claim:

1. In an engine of the character described having a crankshaft and a flywheel therefor, said flywheel comprising a first component flywheel fixed to the crankshaft, a second component flywheel defined by a heavy rim rotatably journalled on the outer annular surface of said first component flywheel and disengageable clutch means operatively connected with said component flywheels for constraining said component flywheels to rotate as a unit.

2. An engine as defined in and claimed by claim 1, further characterized in that said disengageable clutch means is carried by said first component flywheel.

References Cited in the file of this patent

UNITED STATES PATENTS

| 1,703,991 | Day | Mar. 5, 1929 |
| 1,847,784 | Procunier et al. | Jan. 15, 1948 |

FOREIGN PATENTS

| 123,342 | Great Britain | Feb. 6, 1919 |
| 597,000 | Great Britain | Jan. 15, 1948 |